March 1, 1966 L. R. FULTON 3,237,989
DUMP BODY ACCESSORY FOR PICK-UP TRUCK
Filed May 19, 1964 2 Sheets-Sheet 1
FIG___1
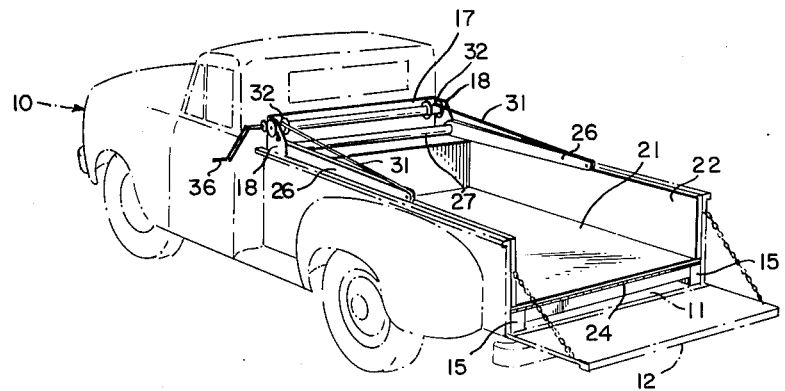
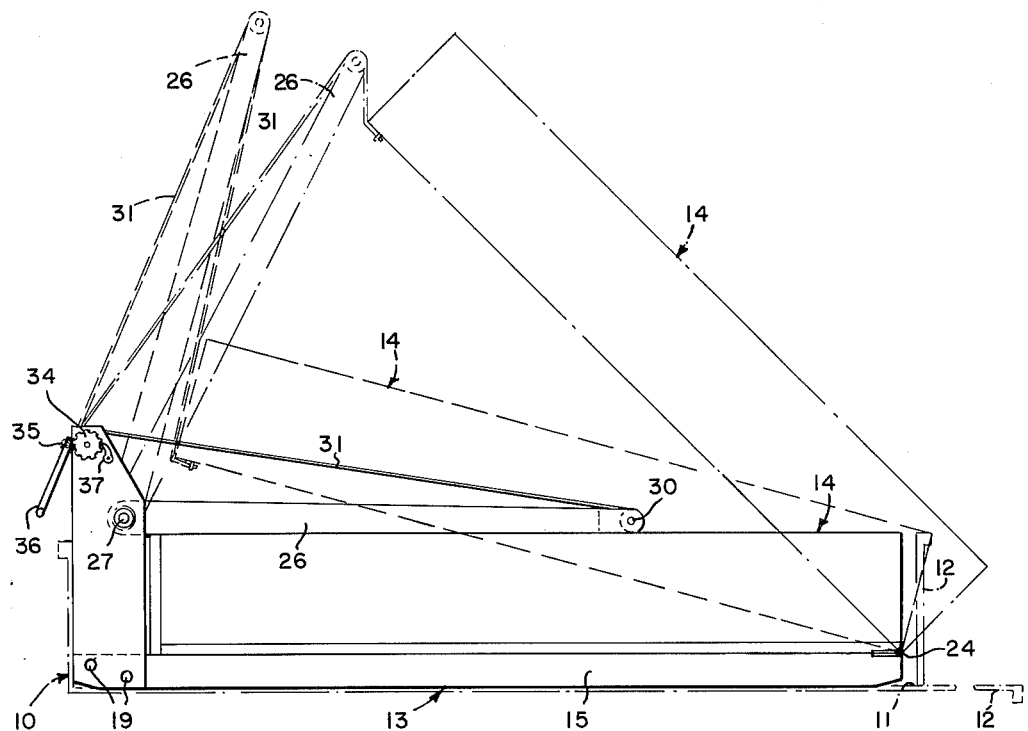
FIG___2
LOYD R. FULTON
INVENTOR.
ATTORNEYS March 1, 1966
L. R. FULTON
3,237,989
DUMP BODY ACCESSORY FOR PICK-UP TRUCK
Filed May 19, 1964
2 Sheets-Sheet 2
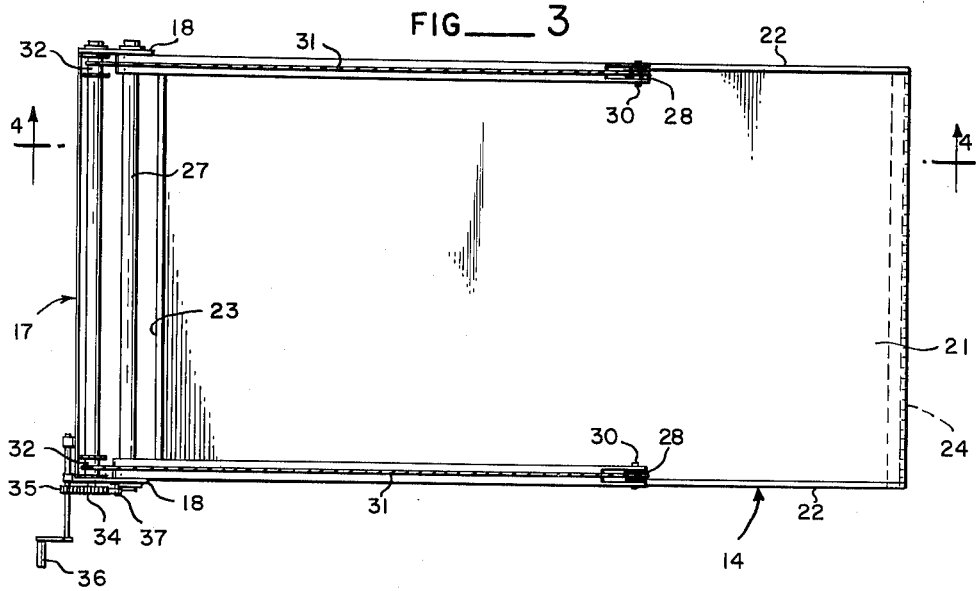
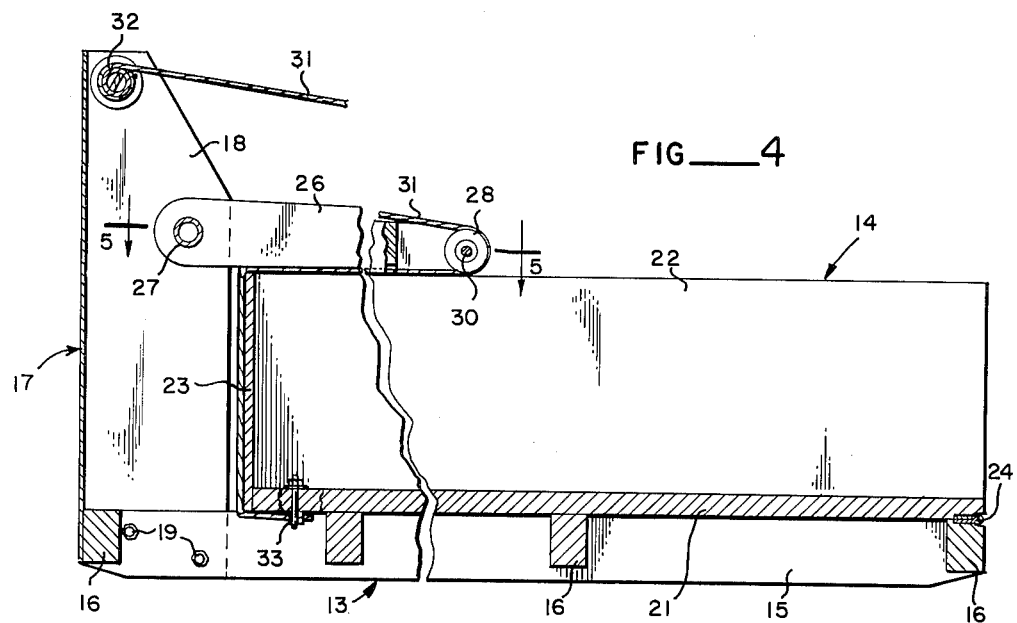
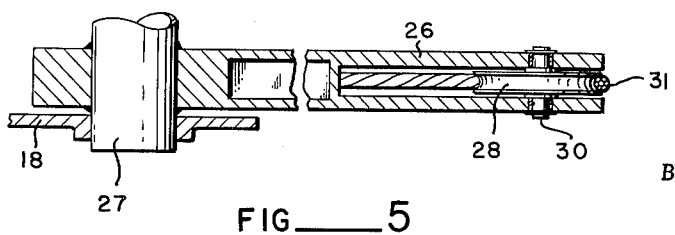
LOYD R. FULTON
*INVENTOR.*
BY Seed & Berry
ATTORNEYS

United States Patent Office 3,237,989
Patented Mar. 1, 1966

3,237,989
DUMP BODY ACCESSORY FOR PICK-UP TRUCK
Loyd R. Fulton, 5518 Roosevelt Way NE.,
Seattle, Wash.
Filed May 19, 1964, Ser. No. 368,501
8 Claims. (Cl. 298—19)

This invention relates to accessory equipment for an open-top truck of the light-duty type commonly known as a half-ton pick-up, and aims to provide a structure by means of which a utility vehicle of this nature can be made to function as a dump truck.

It is a further particular object to device an accessory dump body self-sufficient to perform its intended dump function, one which admits of being applied to and removed from the utility vehicle with ease and expedition, and which requires no bolts or other fastenings to hold the dump body in operating position upon the vehicle.

A still further object of the invention is to provide an accessory dump body of simple, inexpensive and lightweight construction and yet one which will efficiently handle loads within the weight limits of the utility vehicle and give trouble-free service over long periods of usage.

The foregoing and other objects and advantages in view will appear and be understood in the course of the following description and claims, the invention consisting in the novel construction and in the adaptation, arrangement and combination of parts hereinafter described and claimed.

In the accompanying drawings:

FIGURE 1 is a perspective view portraying a dump body constructed in accordance with preferred teachings of the present invention, the view incorporating a phantom illustration of a conventional half-ton pick-up truck to show the position occupied by the body when the same is installed upon the truck.

FIG. 2 is a side elevational view of the dump body, drawn to an enlarged scale and indicating by broken lines two hoisted positions of the body.

FIG. 3 is a top plan view of the dump body.

FIG. 4 is a fragmentary longitudinal vertical sectional view drawn to an enlarged scale on line 4—4 of FIG. 3; and FIG. 5 is a fragmentary horizontal sectional view drawn to an enlarged scale on line 5—5 of FIG. 4.

Referring to said drawings, the numeral 10 represents a half-ton pick-up truck of the conventional type in which the loading deck 11 is walled along the sides and the front, with the top and the back open. A tail-gate 12 provides a flush continuation of the deck when occupying the lowered position in which it is illustrated in FIG. 1, and closes the back opening when raised to the position shown in FIG. 2.

The dump body of the present invention is arranged to be slidably inserted over said tail gate into an operating position upon the deck, and has a width moderately narrower and a length moderately shorter than the corresponding dimension of the deck so that insertion and removal can be easily accomplished. It is essentially a 2-part structure composed of a frame 13 and a dump shell 14 sustained by the frame.

Said frame provides full-length stringers 15 extending along each of the two sides, connected at intervals of the length by cross-ties 16, and has a head board 17 at the front. The head-board rises to a height somewhat above the side and front walls of the truck's loading body and at each of the two sides presents flanges 18 which straddle the stringers and are bolted, as at 19, thereto. The stringers function as skids when inserting and removing the dump body.

Like the loading body of the truck the dump shell 14 of the dump body has a floor wall 21, side walls 22, and a front wall 23, being open at the back and top. A hinge 24 connects the rear edge of the floor to the rear edge of the frame for vertical swing motion of the shell about a transverse horizontal axis. Side edges of the floor rest upon the stringers when the shell occupies a lowered load-receiving position.

Levered hoisting of the shell, for dumping, is performed by two cross-connected boom arms 26 fulcrumed to the flanges 17 of the head-board with the free ends projecting rearwardly from the fulcrum. In the normal lowered position of the shell these free ends each overlie and rest upon a related one of the two side walls 22 of the shell. The boom arms, which are or may be of fabricated box-section construction welded to a pipe 27 which provides the cross-connection and the fulcrum, provide forks at the free end. A respective sheave 28 is journal-mounted by a pin 30 for rotation between the arms of the fork. The bight of a respective hoist rope 31 passes over each of these sheaves. The overwind end of each rope extends forwardly to a spooling drum 32. The underwind end of each rope extends forwardly to the upper edge of the front wall 23, and thence is carried downwardly along the front face of such wall for dead-ending, as at 33, to the floor of the shell.

The two spooling drums, one for each rope, are formed upon a cross-pipe having its ends journaled for rotation in the flanges 18 of the head-board. One end projects beyond the related flange and has a gear wheel 34 fixed thereto. A pinion 35 manually turned by a crank 36 meshes the gear wheel. A pawl for setting the gear wheel is denoted by 37.

While I have shown and described the boom arms as being of box-section fabricated construction, 2 x 4's can be advantageously employed. Also, for stiffening purposes if desired, the cheeks 18 can be interiorly faced with 2 x 8's in the area below the fulcrumed ends of the boom arms, these stiffening 2 x 8's rigidly footing upon ends of the stringers which desirably are drawn from 2 x 4 stock.

It is thought that the construction of the dump body of the present invention and the manner in which the same is operated for dumping the shell will have been clearly understood from the foregoing description. It is my intention that no limitations be implied and that the hereto annexed claims be given the broadest interpretation to which the employed language fairly admits.

What I claim is:

1. Accessory equipment for use with a pick-up truck, comprising a frame sized to seat upon the loading deck of the truck, a dump body hinged along its rear edge to the rear edge of the frame for vertical swing motion from a normal position resting upon the frame into an elevated dumping position, and levered means for raising and lowering the dump body in said vertical swing motion, the dump body being walled along the front and the sides, the frame having a head board substantially higher than the height of said walls and located to the front of the body, the levered means comprising: a boom arm disposed longitudinally of the body with its rear end overlying the front end of said body and its front end fulcrumed to the head board for vertical swing movement about a transverse horizontal axis, a sheave carried by said rear end of the boom arm for rotation about a transverse horizontal axis, and a cable taking a bight around the sheave with an overwind end thereof extending forwardly to the spooling drum of a winch and an underwind end thereof extending forwardly to the upper edge of the dump body's front wall, thence passing downwardly along the front face of said front wall for dead-ending to the underside of the dump body.

2. Structure according to claim 1 in which there are two of said boom arms arranged to swing in concert one at one side and the other at the other side of the dump body each in a vertical plane approximately coinciding with the vertical plane occupied by a related side wall of the body.

3. Structure according to claim 1 in which the winch is carried by the head board with its spooling drum mounted for rotation about a transverse axis occupying a horizontal plane higher than the horizontal plane in which the fulcrum of the boom arm lies.

4. Structure according to claim 1 in which the frame is comprised of skid-forming stringers extending along each of the two sides and connected at spaced intervals of the length by cross-ties.

5. Structure according to claim 1 in which the dump body is walled along the front, the sides, and the bottom by plywood panels, the frame being comprised of skid-forming wood stringers extending along each of the two sides and connected at spaced intervals of the length by wood cross-ties.

6. A dump structure comprising, in combination with a dump body walled along the front and the sides, a frame on which said body seats and hingedly supporting the latter so that the body can swing upwardly about a transverse horizontal axis located at the rear end thereof from a normal position resting upon the frame into an elevated dumping position, a boom arm fulcrumed to the frame for vertical swinging movement about a transverse horizontal axis located adjacent the front end of the body from a normal lowered position in which the arm occupies a generally horizontal position extending longitudinally of the frame, with its free end lying to the rear of the fulcrum, into a raised position in which the boom arm stands erect with its free end elevated above the body, a sheave carried by said free end of the boom arm for rotation about a transverse horizontal axis, and a cable taking a bight around the sheave with its underwind end and its overwind end each extending forwardly from the sheave, said underwind end being attached to the front end of the dump body, said overwind end being wound upon the spooling drum of a winch mounted from the frame for rotation about a transverse axis occupying a horizontal plane substantially higher than the horizontal plane in which the fulcrum of the boom arm lies, the act of taking in cable upon the spooling drum operating automatically to swing the boom arm from its lowered to its raised position.

7. Structure as claimed in claim 6 in which there are two of said boom arms arranged to swing in concert one at one side and the other at the other side of the dump body each in a vertical plane approximately coinciding with the vertical plane in which the related side wall of the body lies, the boom arm resting on said side wall when it occupies its lowered position.

8. Structure as claimed in claim 7 in which the body attachment of the cable which is related to each boom arm is made by running the cable from the sheave of the lowered boom forwardly to and over the upper edge of the dump body's front wall and thence downwardly to and under the lower edge of said front wall where it is dead-ended to the body.

References Cited by the Examiner
UNITED STATES PATENTS

| | | | |
|---|---|---|---|
| 1,457,575 | 6/1923 | Jansen | 298—19 |
| 2,033,209 | 3/1936 | Teetor | 298—19 |
| 2,573,478 | 10/1951 | McKendrey | 298—17 |
| 3,003,810 | 10/1961 | Kloote | 298—28 X |

BENJAMIN HERSH, *Primary Examiner.*